United States Patent [19]

Moodie

[11] 4,280,326

[45] Jul. 28, 1981

[54] GENERATORS OF IMPULSES

[75] Inventor: Keith Moodie, Calver, near Sheffield, England

[73] Assignee: Health and Safety Executive, London, England

[21] Appl. No.: 93,473

[22] Filed: Nov. 13, 1979

Related U.S. Application Data

[63] Continuation of Ser. No. 833,315, Sep. 14, 1977, abandoned.

[30] Foreign Application Priority Data

Sep. 21, 1976 [GB] United Kingdom ............... 39137/76

[51] Int. Cl.[3] ............................................ B60T 13/00

[52] U.S. Cl. .................................... 60/547 R; 60/568; 60/593; 91/533; 92/134

[58] Field of Search ................. 60/537, 593, 560, 568, 60/547 R; 91/5, 48, 417, 235, 321, 533; 92/134, 8, 12

[56] References Cited

U.S. PATENT DOCUMENTS

| | | | |
|---|---|---|---|
| 2,979,903 | 4/1961 | Beck | 60/593 |
| 3,190,077 | 6/1965 | Scholin | 92/8 |
| 3,257,810 | 6/1966 | Hänni | 60/547 |
| 3,424,154 | 1/1969 | Kinsley | 60/593 |
| 3,425,219 | 2/1969 | Oliver | 60/593 |
| 3,531,065 | 9/1970 | Brown | 92/134 |

FOREIGN PATENT DOCUMENTS

| | | | |
|---|---|---|---|
| 2017007 | 10/1971 | Fed. Rep. of Germany | 60/593 |
| 486733 | 6/1972 | France | 60/593 |
| 1276629 | 6/1972 | United Kingdom . | |
| 1281187 | 7/1972 | United Kingdom . | |

*Primary Examiner*—Abraham Hershkovitz

*Attorney, Agent, or Firm*—Pollock, Vande Sande & Priddy

[57] ABSTRACT

An apparatus for use in the generation of impulses, comprising a stepped piston assembly having a large piston and a small piston mechanically linked to one another and reciprocable between forward and rearward positions with the large piston being located in a large cylinder and having a large rearward face in communication with a reservoir for compressed fluid, and with the small piston having a small forward face for delivering the impulse; wherein the stepped piston assembly has an auxiliary piston located between the large piston and the small piston which auxiliary piston is mechanically linked to the large piston and which is reciprocable in an auxiliary cylinder, and wherein there is provided a valve through which fluid can flow from the volume enclosed by the large cylinder forward of the large piston into the volume enclosed by the auxiliary cylinder rearward of the auxiliary piston.

The invention makes possible the provision of a pressure intensifier in which the valve controlling the rapid forward movement of the piston can be situated within the casing of the pressure intensifier, so avoiding the need for large external dump valves and associated pipework.

9 Claims, 2 Drawing Figures

GENERATORS OF IMPULSES

Figure 1:
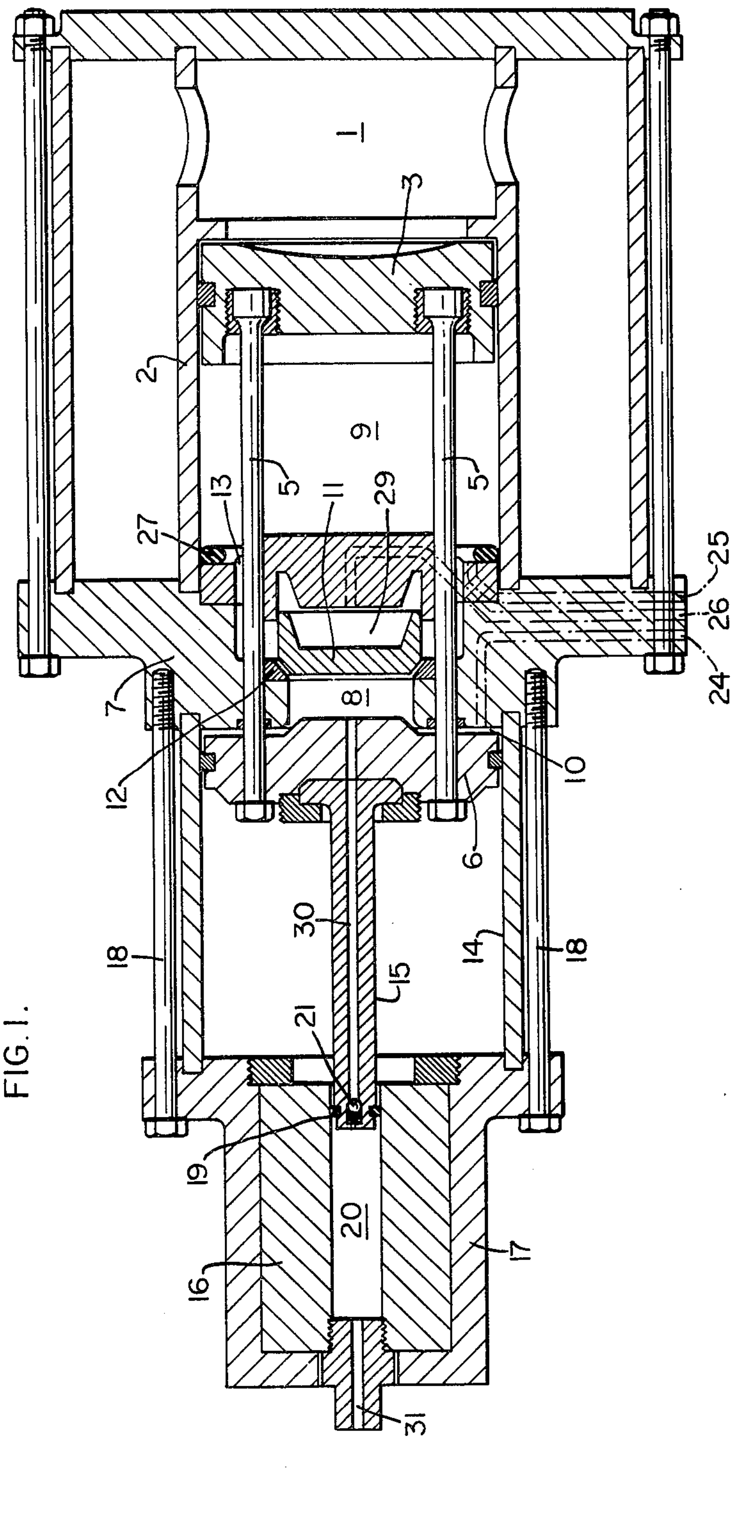

This is a continuation of application Ser. No. 833,315, filed Sept. 14, 1977, now abandoned.

This invention relates to generators of impulses, and more particularly but not exclusively is concerned with stepped piston impulse generators which are fluid pressure intensifiers which can produce pulses of fluid at high pressure.

The present Applicant is aware that it can be useful in mining, tunnelling, rock breaking and like operations to provide a succession of pulses of high pressure fluid to the material which is to be treated. British Patent No. 1,488,797, published Oct. 12, 1977, discloses and claims a fluid pressure intensifier having such uses.

The intensifier specifically described in said British patent has large dump valves and associated pipework situated outside the cylinder of the intensifier.

The function of the dump valves is to allow fluid under pressure in front of and acting against the large diameter portion of the stepped piston of the machine to escape quickly so allowing the piston to move forward rapidly to provide a pulse. This invention seeks to provide a fluid pressure intensifier in which the valve controlling the rapid forward movement of the piston can be situated within the casing of the pressure intensifier, so avoiding the need for large external dump valves and associated pipework.

The above-numbered British patent is concerned with pressure intensifiers having stepped pistons in which the relatively narrow bore portion has a sealing arrangement which is intended to seal in both directions along the bore. The present invention can provide stepped piston pressure intensifiers in which the narrow bore portion has a simpler sealing arrangement which need seal in one direction only. This sealing arrangement must be capable of resisting high pressure of the liquid which is to be ejected from the intensifier. It has been found that such high pressure seals fail in service comparatively frequently and it is another feature of this invention that it makes possible the provision of an apparatus in which the seal which retains the high pressure liquid to be ejected is easily accessible.

With stepped piston pressure intensifiers, it can occur that a charge of liquid to be ejected as a pulse does not flow to the front of the stepped piston as it retracts. This can be harmful to the intensifier in that when the piston is urged forward it initially encounters very little resistance. The present invention makes it possible to provide a fluid pressure intensifier in which there is a low risk as compared with the known stepped piston fluid pressure intensifiers of a charge of liquid not flowing to the front of the piston during retraction of the piston.

The present invention provides apparatus for use in the generation of impulses, comprising a stepped piston assembly having a large piston and a small piston mechanically linked to one another and reciprocable between forward and rearward positions with the large piston being located in a large cylinder and having a large rearward face in communication with a reservoir for pressurized fluid, and with the small piston having a small forward face for delivering the impulse; wherein the stepped piston assembly has an auxiliary piston located between the large piston and the small piston which auxiliary piston is mechanically linked to the large piston and which is reciprocable in an auxiliary cylinder, and wherein there is provided a valve through which fluid can flow from the volume enclosed by the large cylinder forward of the large piston into the volume enclosed by the auxiliary cylinder rearward of the auxiliary piston.

Preferably, the small piston is located in a small cylinder and in use intensifies fluid pressure in the small cylinder to provide pulsed liquid jets from the small cylinder.

Preferably the cross-sectional areas of the large piston and of the auxiliary piston are substantially equal.

Preferably, the reservoir is adapted to contain compressed gas. The gas is preferably inert, a suitable example of such an inert gas being nitrogen. It is envisaged that during operation of the device the maximum pressure of the gas will be of the order of 4,000 psi.

Conveniently, the liquid to be provided to the small cylinder whose pressure is intensified by the device is a mixture of water with a small amount of water-soluble oil. In particular, a mixture of 3% by weight water-soluble oil in water is suitable. It is envisaged that the device will be capable of producing maximum pressures in the liquid of the order of 160,000 psi.

The valve between the large and auxiliary cylinder volumes is preferably a quick-acting valve comprising a movable valve member of circular or annular section which registers with a corresponding annular seat when the valve is closed. The moveable valve member can be urged into registry with the seat by the application of fluid pressure to the face of the valve member remote from the seat. In this case, the valve opens when there is a fluid pressure differential across the moveable valve member which acts to urge the valve member away from the seat.

Figure 2:
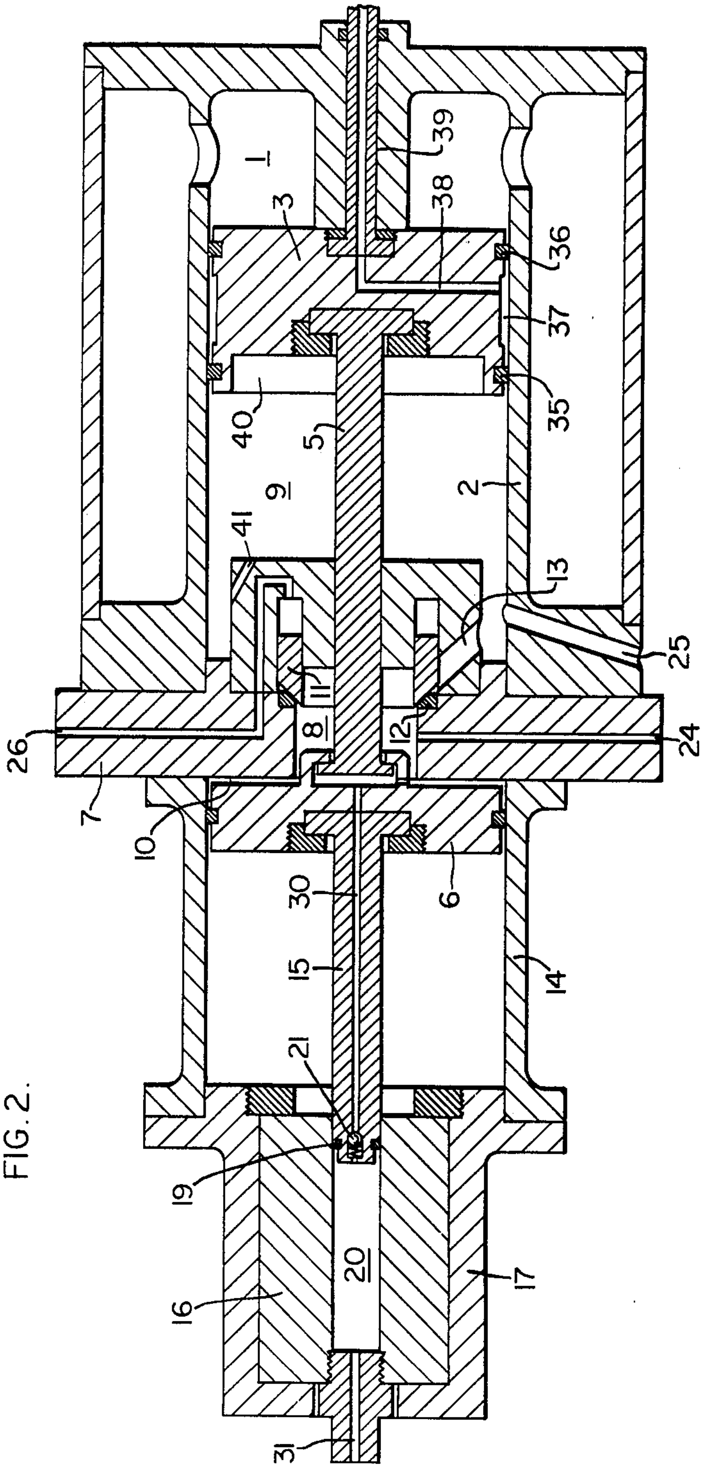

For a better understanding of the invention, and to show more clearly how the same may be carried into effect, reference will now be made to the accompanying drawings in which:

FIG. 1 is a diametral section of a first embodiment of a fluid pressure intensifier and generator of pulsed liquid jets according to the present invention; and FIG. 2 is a diametral section of a second embodiment of such apparatus.

The pressure intensifier shown in FIG. 1 has a reservoir 1 which fits around the open end of a large cylinder 2. The reservoir 1 thus includes an annular space whose inner walls are defined by an area of the outwardly facing walls of the large cylinder. It is believed that this arrangement permits the design of a large cylinder which is less highly stressed in use, and therefore less prone to flexing. Slideable within the cylinder 2 is a large piston 3 whose rear face forms part of the boundary of the reservoir 1. Not shown in FIG. 1 are means to charge the reservoir with nitrogen from a gas booster system to a pressure of around 4,000 psi.

The large piston 3 is connected to an auxiliary piston by two tie rods 5. The auxiliary piston comprises a relatively large diameter portion 6 which is slideable within an auxiliary cylinder 14 and has a radius equal to that of the large piston 3. Carried on the auxiliary piston 6 is a small piston 15 which is slideable along a chamber 20 within a small high pressure cylinder 16. Pistons 3, 6 and 15 are each provided with seals so that they are in fluid-tight registry with the walls of the cylinders in which they move; together they constitute a stepped piston assembly.

The pistons 3 and 6 are separated by a wall 7 in which the tie rods 5 are slideable in fluid-tight manner. The wall 7 is the structural base of the entire device and the cylinders 2 and 14 extend from the two opposed sides of the wall. The reservoir 1 extends into an annular portion around the large cylinder 2 and terminates at the wall 7. The small high-pressure cylinder 16 is located within an outer cylinder 17 which, in turn, engages with the end of the cylinder 14 remote from the wall 7. The outer cylinder 17 and cylinder 14 are retained in position by a plurality of tie rods 18 connecting the outer cylinder 17 with the wall 7.

The wall 7 is provided with a port 8. The port serves to connect a chamber 9 formed by the wall 7, the large cylinder 2 and the forward face of the large piston 3, and a space 10 formed by the wall 7, the auxiliary cylinder 14 and the rearward face of the auxiliary piston 6. Situated within the port 8 is a valve comprising a moveable valve member 11 and an annular metal seat 12 with which the moveable member can register to close the port. The valve member 11 is moveable within a cylindrical blind recess in the wall 7. The extent of its movement along the recess is limited by the end of the recess and by the annular metal seat 12. When the moveable valve member 11 moves off the annular metal seat 12, communication between chamber 9 and space 10 is established through a part-annular passage 13.

An inlet passage 30 for chamber 20 lies within the pistons 6 and 15 and communicates between the space 10 and the chamber 20. At the end of the passage 30 near to the chamber 20 there is provided a non-return valve 21 which is arranged to prevent flow of fluid from the chamber 20 to the space 10. The end of the small piston 15 which moves within the small high pressure cylinder 16 is provided with a high pressure seal 19. The chamber 20 has an outlet passage 31 which can lead to a nozzle set within a mining tool such as a pick.

The device is provided with three fluid passages for supply of fluid from external control valves to various parts of the device. A fluid passage 24 communicates with the space 10, a fluid passage 25 communicates with the chamber 9 and a fluid passage 26 communicates with a chamber 29 situated between the moveable valve member 11 and the end of the blind recess in the wall 7. Forward movement of the stepped piston assembly, i.e. movement to the left in the drawing, is limited by a cushion 27 with which the forward face of the large piston 3 comes into contact.

The fluid pressure intensifier shown in FIG. 1 is operated in the following manner. The normal rest or off position of the device is with the pistons 3 and 6 at the forward ends of their strokes ie as far to the left of the drawing as possible, and with the piston 3 in contact with the cushion 27. The action of the compressed gas in the reservoir 1 is to urge the pistons into this position and rearward movement of the pistons from this position is achieved by the application of fluid pressure to the forward face of the piston 3. The device is charged to that it can deliver a pulse of high pressure liquid from the chamber 20 by first of all closing the valve 11 by supplying pressurized liquid through the passage 26 to the chamber 29 to urge the moveable valve member 11 on to the metal seat 12. When the valve is closed, further fluid is pumped into the chamber 9 through the passage 25. The pressure which is supplied to the passages 25 and 26 is approximately 5,000 psi, and it has been found convenient to use as the fluid a mixture of water and 3% water-soluble oil. The presence of fluid at this pressure in the chamber 9 sets up a pressure differential across the piston 3 which urges it rearwardly in the cylinder 2. This rearward movement of the piston 3 causes the piston 6 to move an equal rearward distance in the cylinder 14. Such movement of the piston 6 expels fluid from the space 10. The fluid can leave the space 10 by passing along the passage 30 and through the valve 21 into the chamber 20, or through the passage 24. However, the passage 24 is connected to a relief valve which is arranged to permit flow of fluid out of the passage 24 only when its pressure exceeds 100 psi. Consequently, fluid will leave the space 10 via the passageway 30 to fill the chamber 20 until its pressure exceeds 100 psi when the remainder of the trapped fluid will leave the space 10 through the passage 24.

When the rearward movement of the pistons 3 and 6 is complete their positions are as shown in FIG. 1. Chamber 20 is full of fluid which cannot pass out of the chamber along the passageway 30 because of the action of the non-return valve 21. Thus, any forward motion of the piston 15 causes fluid to be expelled from the chamber 20 from the forward end of the chamber and through the passage 31. Rapid forward movement of the piston 15 to generate a high pressure of fluid in the chamber 20 is effected by releasing the fluid pressure in the passage 20. This releases the fluid pressure in the chamber 29 and allows the pressurized fluid in the chamber 9 acting through passage 13 against a part of the chamfered face of the moveable valve member 11 to cause member 11 to move rearwardly and thereby to open the valve. Thereafter, the pressure of the fluid in the chamber 9 is rapidly released by flow of fluid through the passage 13 into the space 10 via space 8. Such flow allows the piston 3 to move forwardly in the cylinder 2 under the action of the pressure of gas in the reservoir 1. The resultant rapid forward movement of the piston 15 expels fluid from chamber 20 as a high-pressure jet through the nozzle at pressures of around 160,000 psi. When the piston 3 reaches the end of its forward movement in cylinder 2 the cycle is repeated.

It will be apparent to those skilled in the art that in the illustrated embodiment the valve 11, 12 functions as a dump valve. It is, of course, within the body of the pressure intensifier and consequently the embodiment has no external dump valves or associated large capacity pipework. By "the body" is meant the structural components within which the stepped piston assembly is contained.

Seal 19 is required only to retain high pressure liquid in the volume 20. It is not required to prevent liquid passing from the volume immediately in front of piston 6 into the volume 20. The sealing arrangement situated between piston 15 and cylinder 16 can thus be relatively simple and FIG. 1 shows a construction which could be arranged to provide ready accessibility to the seal 19.

During retraction of the piston 6, working liquid at a pressure of 100 psi acts on the one way valve 21 and will pass through it to fill volume 20. The risk of the valve 21 jamming shut so as to prevent passage of fluid is small so that the risk of volume 20 remaining empty or not completely full is correspondingly small.

FIG. 2 shows a second embodiment of apparatus according to the invention. Many of its components parts are similar in construction to the corresponding parts of FIG. 1, and are identified by like reference numerals. The operation of the device is similar to that of FIG. 1.

It is to be noted that the apparatus of FIG. 2 has only one tie rod 5 and this lies along the longitudinal axis of the piston assembly. The moveable valve member 11 is of annular shape. The large piston 3 has two seals 35 and 36 and an annular recess 37 between them. Communicating with the recess 37 is a bore 38 by which fluid trapped between the seals 35 and 36 can be drained away.

The large piston 3 carries a piston rod 39 which actuates valvegear (not shown) to provide flows of liquid along bores 25 and 26 according to the position of the stepped piston assembly in the cylinders. The large piston 3 has a axial recess 40 in its front face, which recess 40 receives the housing of the movable valve member 11 when the stepped piston assembly is in the fully forward position. A fluid flow path 41 allows fluid trapped in the recess 40 between the housing and the large piston 3 to escape at a controlled rate and this provides a cushioning effect as the stepped piston assembly reaches its most forward position. The large cylinder 2 is placed in tension longitudinally when the reservoir 1 is filled with pressurized gas. It is believed that the provision of an annular gas reservoir around the large cylinder 2 makes it possible to design the large cylinder so that it flexes less in use than it would do if it were to function as an unsupported pressure vessel.

Other embodiments of pressure intensifier according to the present invention will be evident to those skilled in the art.

I claim:

1. A fluid pressure intensifier apparatus operative to generate very high pressure impulses of short duration for use in mining, tunnelling, rock breaking and like operations, comprising a stepped piston assembly having a large piston and a small piston mechanically linked to one another and reciprocable between forward and rearward positions with the large piston being located in a large cylinder and having a large rearward face in communication with a reservoir for compressed fluid, and with the small piston being located in a small cylinder having fluid inlet and outlet passages, said small piston having a small forward face for delivering the pulses of high pressure fluid through said outlet passage, the stepped piston assembly having an auxiliary piston located between the large piston and the small piston which auxiliary piston is mechanically linked to the large piston and which is reciprocable in an auxiliary cylinder, the large cylinder and the auxiliary cylinder having a common end wall, and a valve in said common end wall for controlling the flow of fluid from the volume enclosed by the large cylinder forward of the large piston into the volume enclosed by the auxiliary cylinder rearward of the auxiliary piston.

2. An apparatus as claimed in claim 1 wherein the cross-sectional areas of the large piston and of the auxiliary piston are substantially equal.

3. An apparatus as claimed in claim 1 wherein the reservoir is suitable for containing compressed gas.

4. An apparatus as claimed in claim 1 wherein the valve comprises a circular or annular movable valve member which registers with an annular seat.

5. An apparatus as claimed in claim 4 wherein means are provided to apply a fluid pressure to a face of the movable valve member remote from the annular seat, to urge the valve member into registry with the seat.

6. An apparatus as claimed in claim 1 wherein the large piston and the auxiliary piston are mechanically linked by a tie rod.

7. An apparatus as claimed in claim 6 wherein the large piston and the auxiliary piston are mechanically linked by a plurality of tie rods.

8. An apparatus as claimed in claim 1 wherein the fluid reservoir includes an annular space whose inner wall is defined by an area of the outwardly facing walls of the large cylinder.

9. An apparatus as claimed in claim 1 wherein the fluid inlet passage is defined by the small piston and the auxiliary piston and communicates with the volume enclosed by the auxiliary cylinder rearward of the auxiliary piston.

* * * * *